United States Patent
Schneider

(10) Patent No.: US 6,540,499 B2
(45) Date of Patent: Apr. 1, 2003

(54) MODULAR MOLD ASSEMBLY

(75) Inventor: Douglas K. Schneider, Ellington, CT (US)

(73) Assignee: Omni Mold Systems, South Windsor, CT (US)

( * ) Notice: Subject to any disclaimer, the term of this patent is extended or adjusted under 35 U.S.C. 154(b) by 72 days.

(21) Appl. No.: 09/840,377

(22) Filed: Apr. 23, 2001

(65) Prior Publication Data

US 2002/0155191 A1 Oct. 24, 2002

(51) Int. Cl.⁷ .............................................. B29C 45/66
(52) U.S. Cl. ..................... 425/190; 425/192 R; 425/595
(58) Field of Search ................................. 425/185, 190, 425/193, 572, 588, 589, 592, 593, 595 451.6, 451.7, 443, 192 R

(56) References Cited

U.S. PATENT DOCUMENTS

| | | | | |
|---|---|---|---|---|
| 4,395,222 A | * | 7/1983 | Gaiser et al. | ............... 425/572 |
| 4,561,626 A | * | 12/1985 | Black | .......................... 425/588 |
| 5,114,330 A | * | 5/1992 | Nielsen | ...................... 425/193 |
| 5,494,435 A | * | 2/1996 | Vandenberg | ................. 425/589 |
| 5,595,771 A | * | 1/1997 | Foltuz et al. | ................ 425/443 |
| 6,010,324 A | * | 1/2000 | Oshiro et al. | ................ 425/595 |

\* cited by examiner

*Primary Examiner*—Tim Heitbrink
(74) *Attorney, Agent, or Firm*—McCormick, Paulding & Huber LLP

(57) ABSTRACT

In a modular mold assembly first and second mold frame halves used to define at least one aperture extending therethrough, the apertures cooperating to define a mold module cavity when said first and second halves are assembled. At least one mold module slidingly receivable in each of the apertures and can be locked therein securing the mold module within the mold cavity in response to the first and second halves being in engagement with one another. Upon separation of the mold halves, the modules are released and can be removed.

19 Claims, 3 Drawing Sheets

MODULAR MOLD ASSEMBLY

FIELD OF THE PRESENT INVENTION

The present invention is generally directed to molds used in injection molding machines, and is more specifically directed to a mold having cavities adapted to receive and retain mold inserts.

BACKGROUND OF THE PRESENT INVENTION

Molds used in injection molding machines generally include mold halves or sections which include portions that define the features of the items being molded. Since injection molding machines involve high temperatures and pressures, as well as mechanisms for cooling and ejecting molded components, the actual portion of the mold that defines the shape of the final product to be molded comprises only a small part of the entire mold assembly. As such it is beneficial to provide interchangeable mold modules that comprise that portion of the mold that defines the final molded product while maintaining a module support frame common to any number of these modules.

As such, molds used in the injection molding process often include a frame having one or more cavities therein each adapted to accept a mold module for producing the same or different molded parts. In general these mold modules are bolted in place and must be unbolted to remove the module from the mold. This is often time consuming and inconvenient as tools must be on hand to at least partially disassemble the mold. In addition, the bolts can be difficult to remove; sometimes resulting in stripped threads in the mold as well as in broken bolts. Moreover if a module must be changed quickly, the mold and module may be extremely hot further exacerbating the problem of mold removal.

Based on the foregoing, it is the general object of the present invention to provide a mold assembly that overcomes the problems associated with prior art molds.

SUMMARY OF THE PRESENT INVENTION

The present invention is directed in one aspect to a modular mold assembly comprising first and second mold frame halves, each defining at least one aperture extending therethrough. When the mold halves are assembled, these apertures cooperate to define a mold cavity. A mold module having a surface defining at least in part a portion of the item to be molded, is slidingly receivable in each of the apertures defined by the first and second mold frame halves. Once the mold modules are positioned within the apertures, locking means are employed to secure each mold module within its respective aperture in response to the first and second mold frame halves being brought into engagement with one another. The locking means also acts to release each mold module from a respective one of the first and second mold frame halves is response to the first and second mold frame halves being separated from one another.

In the preferred embodiment of the present invention, the locking means includes a first and second locking wedge; each with first locking wedges being coupled of the first and second mold frame halves and positioned in each apertures. The second locking wedges are slidingly coupled to the first locking wedges and are movable between a locked position wherein an outwardly facing surface defined by the second locking wedges thereby engages and securely retains the mold module positioned in one of the mold frame half apertures, and an unlocked position wherein the outwardly facing surface is spaced away from the mold module, making the mold module freely removable from the respective first or second mold frame half.

In the preferred embodiment of the present invention, the first locking wedges each define a tapered surface slidingly engaged with a respective one of the second locking wedges. Accordingly, as the first and second mold frame halves are brought into engagement with one another, the tapered surface of the first locking wedges progressively engages the second locking wedge causing the outwardly facing surface to engage the mold module releasably retaining it within the mold cavity. Conversely, upon separation of the first and second mold frame halves, the tapered surface of the first locking wedges progressively disengages the second locking wedge causing the outwardly facing surface to move away from the mold module thereby allowing it to be freely removable from the aperture in either the first or second mold frame halves.

Preferably, a respective one of each of the second locking wedge and lacking wedges defines a dovetail-shaped groove with the other defining an outwardly projecting dovetail-shaped protrusion adapted to mate with the groove. It is also preferable that the surface of the second locking wedge engageable with the first locking wedge also be tapered. In this manner, small movements of the first locking wedge relative to the second locking wedge causes larger concomitant movement of the outwardly facing surface of the second locking wedge toward or away from the mold module.

The preferred embodiment of the present invention also includes a mold frame base upon which are positioned the first and second mold frame halves, one-on-top-of-the-other. A series of springs are positioned between the mold frame halves for urging the halves away from one another. During a molding operation the mold frame halves are pressed together and retained in that position be one or more clamps movable between a locked and unlocked position.

A mounting plate is coupled to the mold modules positioned within the apertures in the mold frame halves. A mounting member projects outwardly from the mounting plate and is adapted to frictionally engage a bushing positioned in an aperture defined by the mold frame base. The frictional force exerted between the mounting member and the bushing is sufficient to hold the mounting modules in place when the mold frame halves are separated to eject the molded items from the mold modules. The frictional force is not sufficient to overcome the force exerted by the springs, thereby allowing the first and second mold frame halves to separate when the clamp is released.

Preferably, the mounting member is in the form of a polymeric bushing threadedly attached to the mounting plate via a fastener. The polymeric bushing includes a tapered bore extending longitudinally therethrough and the fastener defines a tapered peripheral surface adapted to mate with the tapered bore so that subsequent tightening of the fastener causes an outer periphery defined by the polymeric bushing to expand, thereby providing the capability to set the desired amount of friction between the bushing in the mold frame base and the polymeric bushing. While a polymeric bushing has been described, the present invention is not limited in this regard as other materials such as metals or elastomers can be substituted without departing from the broader aspects of the present invention.

DETAILED DESCRIPTION OF THE PREFERRED EMBODIMENT

Figure 1:
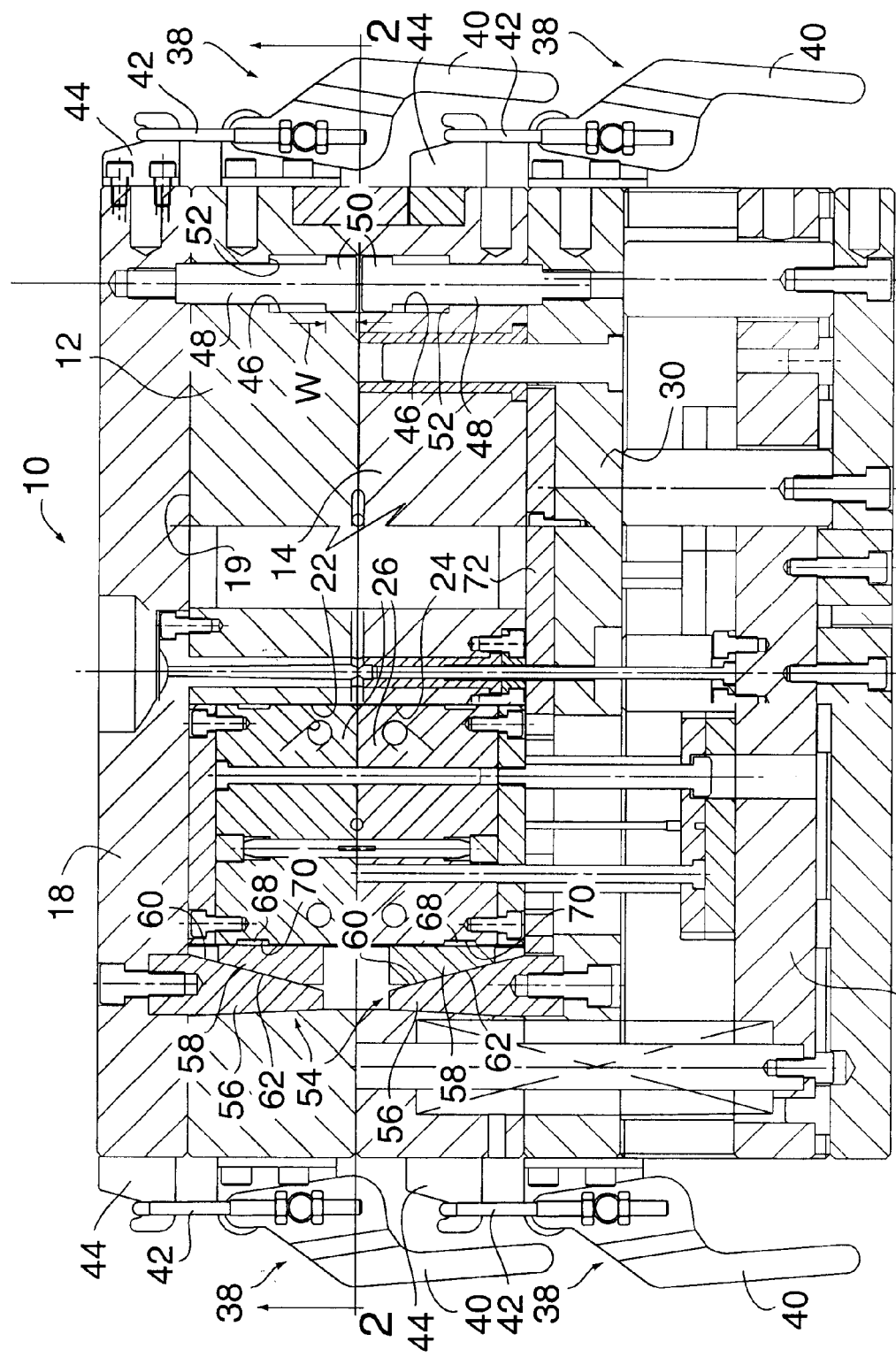
FIG. 1 is a cross-sectional front elevational view of a mold embodying the present invention.
Figure 2:
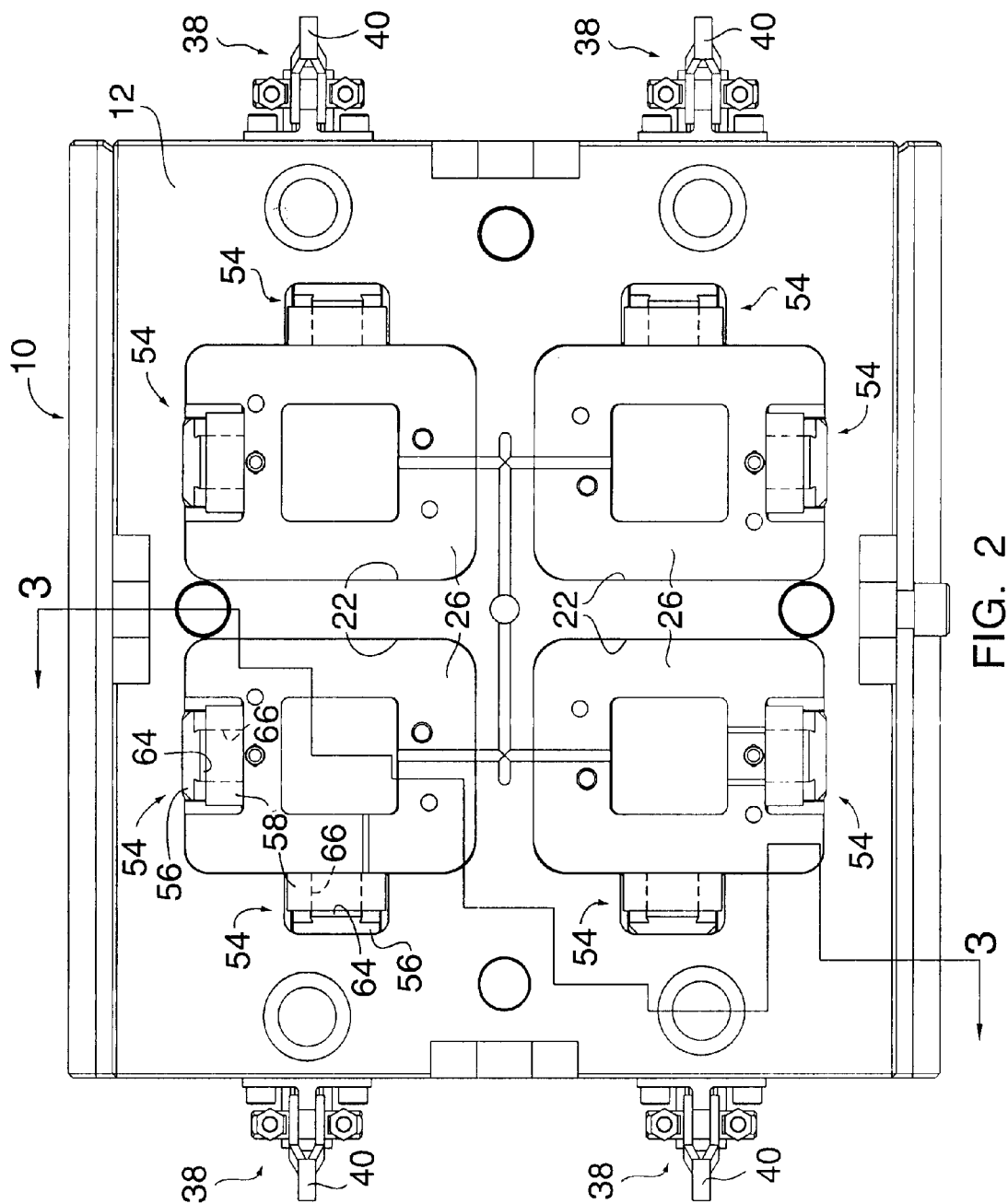
FIG. 2 is a view of the mold of FIG. 1 taken along the line 2—2.

As shown in FIGS. 1 and 2, a mold incorporating the present invention is generally designated by the reference number 10 and includes first and second mold frame halves, 12 and 14 respectively. The first and second mold frame halves, 12 and 14, are supported on a mold base assembly generally designated by the reference number 16. A top plate 18 is positioned on an upper surface 19 of the first mold frame half 12 so that the first and second mold frame halves are interposed between the top plate and the mold base assembly 16.

As best seen in FIG. 2, the four apertures 22 extend through the first mold frame half 12. The apertures 22 are in turn approximately aligned with apertures 24 extending through the second mold frame half 14 there apertures also have approximately the same peripheral shape as the apertures 22. Together the apertures 22 and 24 extending through the first and second mold frame halves, 12 and 14 respectively, cooperate to define mold cavities adapted to receive at least a pair of mold modules generally designated by the reference number 26 and positioned one on top of the other with the mating surfaces of the pair of mold modules coacting to define the geometry of a part to be molded. While four mold modules 26 have been shown and described, the present invention is not limited in this regard as any number of mold modules and corresponding cavities can be employed without departing from the broader aspects of the present invention.

Figure 3:
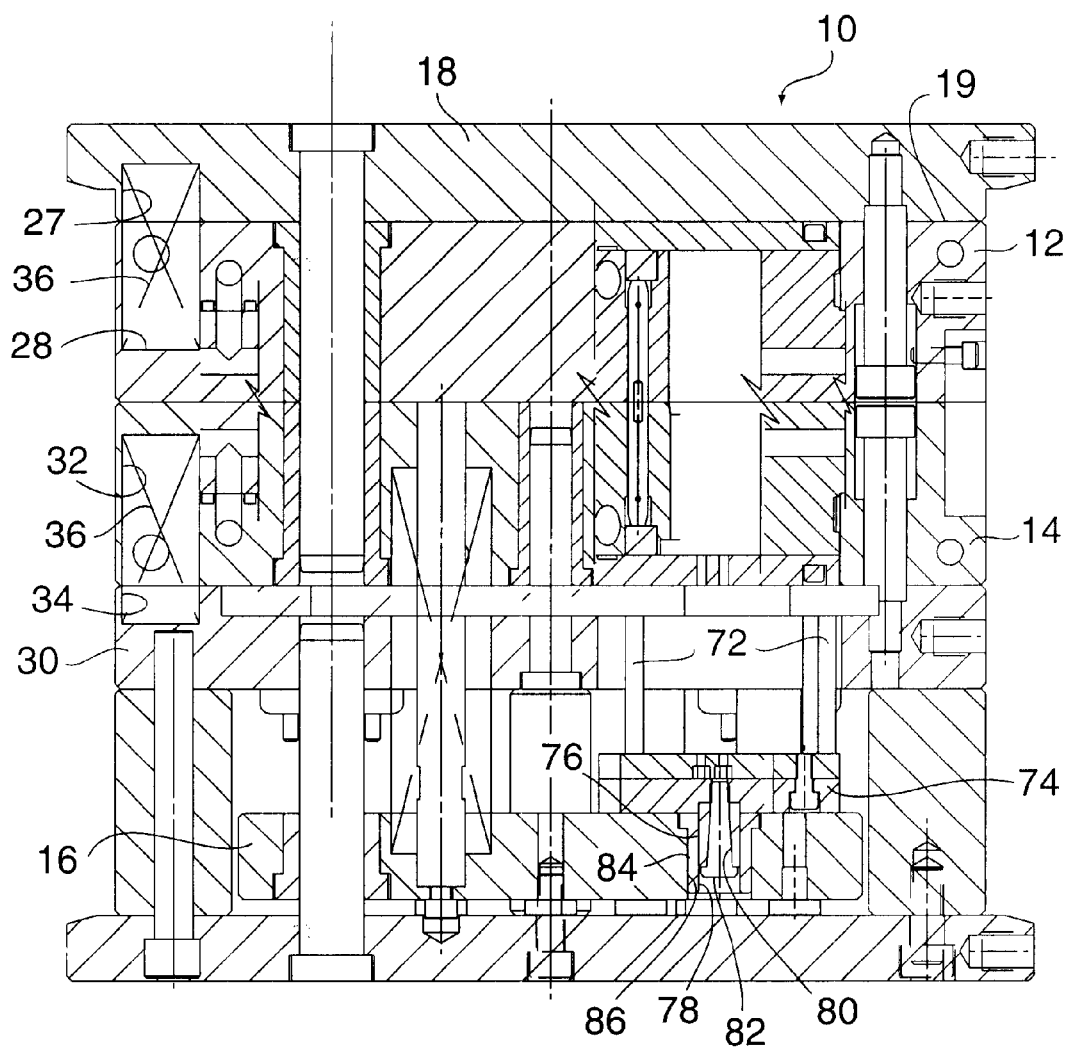
FIG. 3 is a cross-sectional, view of the mold of FIG. 1 taken along the line 3—3.

As shown in FIG. 3, the top plate 18 and the first mold frame half 12, each define a plurality of bores (only one shown), 27 and 28 respectively, extending partway therethrough with a bore 27 in the top plate being approximately aligned with a corresponding bore 28 in the first mold frame half. Likewise the second mold frame half 14 and a bottom plate 30 forming part of the mold base assembly 16 also each include a plurality of bores (only one shown), 32 and 34 respectively, extending partway therethrough with a bore 32 in the second mold frame half being approximately aligned with a corresponding bore 34 in the bottom plate. A spring, shown schematically in FIG. 3 as element 36, is positioned in each of the cavities formed by the bores 27 and 28, and 32 and 34, for biasing the top plate 18 away from the first mold frame half 12, and the second mold frame half 14 away from the bottom plate 30 when the mold is in an open position (the mold is shown in a closed position in FIG. 3).

Referring back to FIG. 1, a plurality of toggle clamp assemblies (four shown) generally designated by the reference number 38 are provided to hold the mold 10 in the closed position against the biasing force exerted by the springs 36. Each toggle clamp assembly 38 includes a locking/release lever 40, a clamping arm 42 coupled to the locking/release lever, and a clamping bracket 44. During a clamping operation, the clamping arm 42 is engaged with the clamping bracket 44 and is moved to the locked position as shown in FIG. 1. While toggle clamp assemblies have been shown and described, the present invention is not limited in this regard as other clamping or fastening mechanisms, such as bolts, quarter-turn fasteners, or C-type clamps may be substituted.

The first and second mold frame halves, 12 and 14 respectively, each define stepped bores 46, only two shown in FIG. 1, extending therethrough. A shoulder screw 48 is positioned in each stepped bore 46 with one shoulder screw having an end threadedly engaged with the bottom plate 30, and the other threadedly engaged with the top plate 18. Each of the stepped bores 46 include a portion of sufficient size to slidingly receive a head portion 50 defined by each shoulder screw 48. This portion of the stepped bores 46 have a length greater than the width "W" of the head portion. Accordingly, when the toggle clamp assemblies 38 are released, the springs 36, FIG. 3, urge the top plate 18 and the second mold frame half 14 toward the open position. This causes the head portions 50 of the shoulder screw 48 engaged with the top plate 18 to move relative to the first mold frame half 12. Concomitantly, the second mold frame half 14 moves relative to the head portions 50 of the shoulders screws threadedly engaged with the bottom plate 30. The amount of movement of the top plate 18 and the second mold frame half 14 in moving from the closed to the open positions is limited by the heads 50 of the shoulder screws 48 contacting the first and second mold frame halves, 12 and 14 respectively, at the junctions 52 defined by the stepped bores 46.

Still referring to FIG. 1, the preferred embodiment of the present invention includes locking mechanisms generally designated by the reference number 54 positioned in each of the apertures 22 and 24 defined by the first and second mold frame halves 12 and 14 respectively. The locking mechanisms 54 each include first and second locking wedges 56 and 58 respectively, with the first locking wedge being attached via a fastener to either the top plate 18 or the bottom plate 30. The first locking wedge 56 defines a first tapered surface 60 slidingly engaged with a second tapered surface 62 defined by the second locking wedge 58. Referring to FIG. 2 the first locking wedge also defines a dovetail/shaped protrusion 64 projecting outwardly from the tapered surface 60 and extending longitudinally therealong. The tapered surface 62 of the second locking wedge 58 defines a dovetail-shaped groove 66, extending longitudinally therealong and adapted to slidingly mate with the dovetail-shaped protrusion 64. The second locking wedge 58 also includes a locking tab 68 projecting outwardly therefrom and adapted to engage a corresponding slot 70 defined by the mold module 26 positioned adjacent to the second locking wedge.

As the first and second mold frame halves, 12 and 14 respectively are moved from the open to the closed position, the movement of the top plate 18, and the second mold frame half 14 causes the tapered surface 60 of the first locking wedge 56 to progressively and slidingly engage the tapered surface 62 of the second locking wedge 58. This causes the locking tab 68 to engage the slot 70 thereby releasably securing the respective mold module 26 in place. Conversely, as the mold is moved from the closed to the open position the dovetail connection between the first and second locking wedges causes the locking tab 68 to move out of, and away from the slot 70 thereby allowing the respective mold module to be easily removed.

Referring to FIG. 3, in addition to the above-described locking wedges, the mold module 26 positioned in the second mold frame half 14 includes spacers 72 coupled thereto and extending to a mounting plate 74. A generally cylindrical mounting member 76 is positioned within a recess 78 defined by the mounting plate 74 and includes a tapered bore 80 extending therethrough. A fastener 82 having a tapered outer surface complimentary in shape to the tapered bore 80 is positioned therein and threadedly engaged with the mounting plate. The mounting member 76 is slidably received in a bushing 84 that in turn is positioned in an aperture 86 defined by the mold frame base 16.

Preferably, the mounting member is formed from a suitable type of material, such as, but not limited to a polymer, so that as the fastener 82 is tightened, the mounting member 76 expands causing it to frictionally engage the bushing 84. Accordingly, when the first and second mold frame halves are moved to the open position so that the locking wedges disengage the mold modules 26 the friction between the mounting member 76 and the bushing 84 is insufficient to resist the force exerted by the springs, so that the mounting member slides relative to the bushing. However, the frictional force is sufficient to hold the mold module 26 in place to allow a molded part to be ejected.

Various modifications and substitutions may be made without departing from the spirit and scope of the invention. Accordingly, it is to be understood that the present invention has been described by way of example, and not by limitation.

What is claimed is:

1. A modular mold assembly comprising:

first and second mold frame halves, each defining at least one aperture extending therethrough, said apertures cooperating to define a mold module cavity when said first and second mold frame halves are assembled;

at least one mold module slidingly receivable in each of said apertures;

locking means, for securing said mold module within said mold cavity in response to said first and second mold halves being in engagement with one another, and for releasing said mold module in response to said first and second mold frame halves being separated from one another.

2. A modular mold assembly as defined by claim 1 wherein:

said locking means includes a first locking wedge positioned within each of said apertures defined by said first and second mold frame halves, said first locking wedge being movable between a locked position wherein an outwardly facing surface defined by said first locking wedge engages and securedly retains said mold module positioned in each of said first and second mold frame halves, and an unlocked position wherein said outwardly facing surface is spaced away from said mold module, making said mold module freely removable from one of said first and second mold frame halves.

3. A modular mold assembly as defined by claim 2, wherein:

said locking means includes at least two second locking wedges mounted to each of said first and second mold frame halves, said second locking wedges each defining at least one tapered surface; and wherein one of said first locking wedges is slidingly coupled to each of said tapered surfaces such that movement of said first and second mold frame halves from an open to a closed position engagement with one another causes said tapered surfaces to progressively move said outwardly facing surfaces into engagement with a respective one of said mold modules, and movement of said first and second mold frame halves from said closed to said open position causes said tapered surfaces to progressively move said outwardly facing surfaces away from said mold modules.

4. A modular mold assembly as defined by claim 2, wherein:

said mold modules each include at least one surface defining a recess therein; and said outwardly facing surfaces of said second locking wedges each define a tab having a shape complementary to said recess so that when said first and second mold frame halves are moved into engagement with one another, said tabs are received in said recesses thereby locking said mold modules into said cavities.

5. A modular mold assembly as defined by claim 4 wherein said recess is a slot extending at least partway across a side surface defined by said mold module.

6. A modular mold assembly as defined by claim 1, further comprising:

biasing means positioned between said first and second mold frame halves for urging said mold frame halves away from one another.

7. A modular mold assembly as defined by claim 6, further comprising clamping means for releasably forcing said first and second mold frame halves together prior to a molding operation.

8. A modular mold assembly as defined by claim 7 wherein said biasing means is in the form of at least one spring and said clamping means is in the form of at least one toggle clamp.

9. A modular mold assembly as defined by claim 3 wherein:

one of said first and second locking wedges defines a dovetail-shaped groove and the other of said first and second locking wedge defines an outwardly extending protrusion having a shape complimentary to, and adapted to be slidingly received in, said dovetail-shaped groove.

10. A modular mold assembly comprising:

first and second mold frame halves coupled together for movement between a closed position wherein said first and second mold frame halves are in engagement with one another, and an open position wherein said first and second mold frame halves are spaced away from one another;

each of said first and second mold frame halves defining at least one aperture extending at least part way therethrough, said apertures being substantially aligned with one another and cooperating to define at least one mold cavity when said first and second mold frame halves are in said closed position;

at least one mold module adapted to be slidably received in each of said cavities, each mold module having a side surface defining a slot extending thereacross;

a first locking wedge coupled to each of said first and second mold frame halves and defining at least one tapered surface;

a second locking-wedge slidingly coupled to each of said first locking wedges;

said second locking wedges each defining a tab extending outwardly therefrom so that when said mold modules are positioned in said cavity and said first and second mold frame halves are moved from said open to said closed position, said tapered surfaces progressively engage one another thereby causing each of said tabs to engage a respective one of said slots thereby releasably locking said mold modules in said cavity; and whereby movement of said first and second mold halves from said closed to said open position causes said second locking wedges to move away from said mold module so that said tab disengages said slot mold module can be removed from said cavity.

11. A modular mold assembly as defined by claim 3, wherein: each of said first and second mold frame halves has at least one of said first locking wedges coupled thereto; and each of said first locking wedges has one of said second locking wedges slidingly mounted thereon, so that when said first and second mold halves are brought into engagement with one another the tapered surface of each of said first locking wedges progressively engages said second locking wedge associated therewith and moves said locking surface into engagement with said mold module, thereby releasably locking said mold module in said cavity.

12. A modular mold assembly as defined by claim 1 further comprising:

a mold frame including said first and second mold frame halves and a mold frame base upon which said first and second mold frame halves are releasably mountable;

a mounting plate coupled to said mold frame module; and a mounting member projecting outwardly from said mounting plate and adapted to be frictionally received within an aperture defined by a mold base assembly.

13. A modular mold assembly as defined by claim 12 wherein:

said mounting member includes an expandable bushing threadably attached to said mounting plate via a tapered fastener, so that the more said tapered fastener is threaded into said mounting plate, the more a peripheral surface defined by said expandable bushing enlarges; and whereby the greater the amount said peripheral surface is expanded, the greater the amount of friction between said mounting member and said mold frame base when said mounting member is positioned therein.

14. A modular mold assembly as defined by claim 13 further comprising a bushing positioned in said aperture in said mold base assembly; and wherein said expandable bushing frictionally engages said bushing.

15. A modular mold assembly comprising;

first and second mold frame halves releasably coupled together and adapted to move between an open and closed position;

each of said mold frame halves defining at least one aperture, said aperture in said first mold frame half being approximately aligned with said aperture in said second mold frame half, said apertures cooperating to define a mold cavity when said first and second mold frame halves are in said closed position;

at least one mold module adapted to be slidingly received in said mold cavity;

a mounting plate coupled to said mold module; and a mounting member projecting outwardly from said mounting plate and adapted to frictionally engage an aperture defined by a mold base assembly.

16. A modular mold assembly as defined by claim 15 wherein said mounting member includes an expandable bushing threadably attached to said mounting plate via a tapered fastener, so that the more said tapered fastener is threaded into said mounting plate, the more a peripheral surface defined by said expandable bushing enlarges; and whereby the greater the amount said peripheral surface is expanded, the greater the amount of friction between said mounting member and said mold base assembly when said mounting member is positioned therein.

17. A modular mold assembly as defined by claim 15 further comprising a bushing positioned in said aperture in said mold base assembly; and wherein said expandable bushing frictionally engages said bushing in said mold base assembly.

18. A modular mold assembly as defined by claim 16 wherein said expandable bushing is formed from a polymeric material.

19. A modular mold assembly as defined by claim 13 wherein said expandable bushing is formed from a polymeric material.

* * * * *